UNITED STATES PATENT OFFICE.

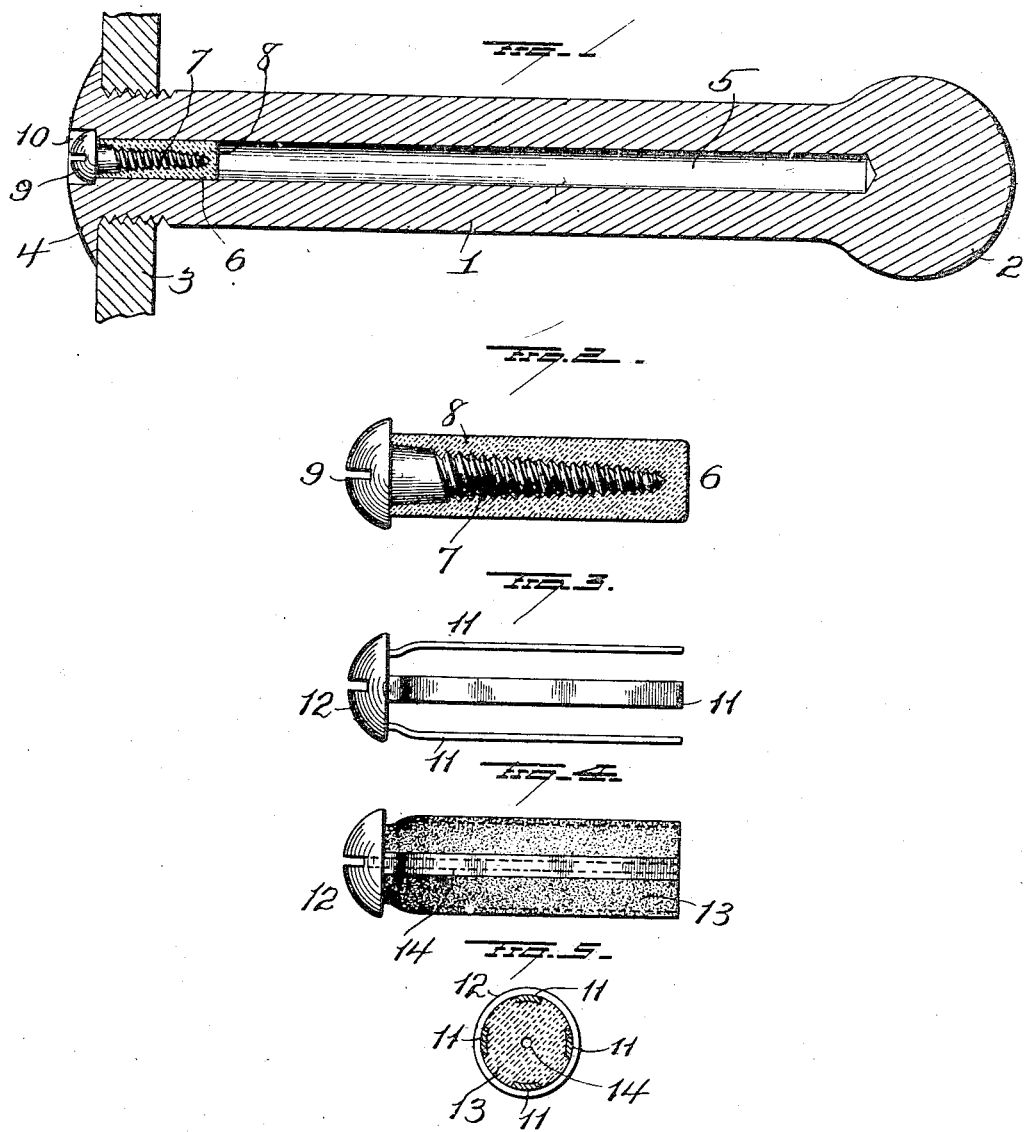

JOHN ROGERS FLANNERY, OF PITTSBURGH, PENNSYLVANIA, ASSIGNOR TO FLANNERY BOLT COMPANY, OF PITTSBURGH, PENNSYLVANIA.

STAY-BOLT STRUCTURE.

1,281,932.　　　　Specification of Letters Patent.　　Patented Oct. 15, 1918.

Application filed October 5, 1917.　Serial No. 194,936.

*To all whom it may concern:*

Be it known that I, JOHN R. FLANNERY, a citizen of the United States, and a resident of Pittsburgh, in the county of Allegheny and State of Pennsylvania, have invented certain new and useful Improvements in Stay-Bolt Structures; and I do hereby declare the following to be a full, clear, and exact description of the invention, such as will enable others skilled in the art to which it appertains to make and use the same.

This invention relates to improvements in staybolt structures, and more particularly to means for denoting the condition of integrity of stay bolts for boilers,—the object of the invention being to provide simple and efficient means which will operate to denote the existence of a rupture in a boiler staybolt.

A further object is to provide a closure for the inner end of a tell-tale hole or bore of a staybolt which will be loosened or released when moisture enters said tell-tale hole or bore in the event of rupture of the bolt.

With these and other objects in view, the invention consists in certain novel features of construction and combinations of parts as hereinafter set forth and pointed out in the claims.

In the accompanying drawing; Figure 1 is a view showing a staybolt structure embodying my invention; Fig. 2 is an enlarged detail view of the tell-tale hole closure, and Figs. 3, 4 and 5 are enlarged views illustrating a modification of said closure.

1 represents a boiler stay bolt of the "flexible" type, having a rounded head 2 at its outer end, the inner end of the bolt being threaded to pass through an inner boiler sheet 3 and upset against the latter as shown at 4.

The bolt is provided with a tell-tale hole or bore 5 which may extend from the inner end of the bolt to a point within the head at the outer end thereof.

The inner end of the tell-tale hole or bore 5 is normally sealed by a closure 6 which serves to prevent the leakage of water from the bore in the event of breakage of the bolt, and which also serves to prevent the entrance into said bore, of solid particles which might clog the same.

The closure 6 comprises a metal member 7, and a composite member 8. The metal member 7 may conveniently consist of a screw or a pin having a roughened surface, and it will preferably be made with a slotted head 9 which may be seated in a recess 10 in the bolt and cover the inner end of the bore. The composite member 8 of the closure 6 is made of material which shall be readily soluble in water and may consist, for example, of a compound of aluminum and sodium hydroxid. The aluminum may be in the form of particles of metallic aluminum intermixed with the hydroxid. This compound may be molded or compressed into the form of a plug with the shank of the screw or other metal member embedded therein. The plug or closure thus formed may be driven into the bore 5 of the bolt so as to close the inner end thereof, as shown in Fig. 1.

Should the bolt become ruptured, moisture will enter the bore 5 and act upon the composition 8 of the plug or closure so as to dissolve the same and thus release the metal member or screw 7. The said metal member will be thus loosened or may drop out and in either event, notice will thereby be given that the bolt is ruptured.

Instead of constructing the metal member of the plug or closure with a threaded shank as shown in Figs. 1 and 2, I may employ a plurality of spring shanks 11 secured to a common slotted head 12, so as to form a cage which will receive or be embedded in the composition 13, as shown in Figs. 4 and 5 and if desired an air vent 14 may be provided through the plug to permit escape of air when the plug is being inserted into the bore of the bolt.

Other changes might be made in the details of construction of my invention without departing from the spirit thereof or limiting its scope, and hence I do not wish to restrict myself to the precise details herein set forth, except as required by the scope of the appended claims.

Having fully described my invention what I claim as new and desire to secure by Letters-Patent, is:—

1. A staybolt for boilers, having a tell-tale bore, and a closure for said bore comprising an insoluble member and a soluble member; whereby when moisture enters the bore the insoluble member will be released.

2. A staybolt for boilers, having a tell-tale bore, and a closure comprising a metal member and a soluble member normally held in place by the soluble member.

3. A staybolt for boilers, having a tell-tale bore, and a closure for said bore comprising a roughened shank and a soluble member in which said shank is embedded.

4. A staybolt for boilers, having a tell-tale bore, a plug closing one end of said bore and comprising a headed shank and soluble material in which said shank is embedded, and the bolt having a recessed seat to receive the head of said shank.

5. A staybolt for boilers having a tell-tale bore, and a closure for said bore comprising an insoluble member and a soluble member, the latter comprising aluminum and a hydroxid, substantially as described.

In testimony whereof, I have signed this specification in the presence of two subscribing witnesses.

JOHN ROGERS FLANNERY.

Witnesses:
 ETHAN I. DODDS,
 EDWIN S. RYCE.